Figure 1:
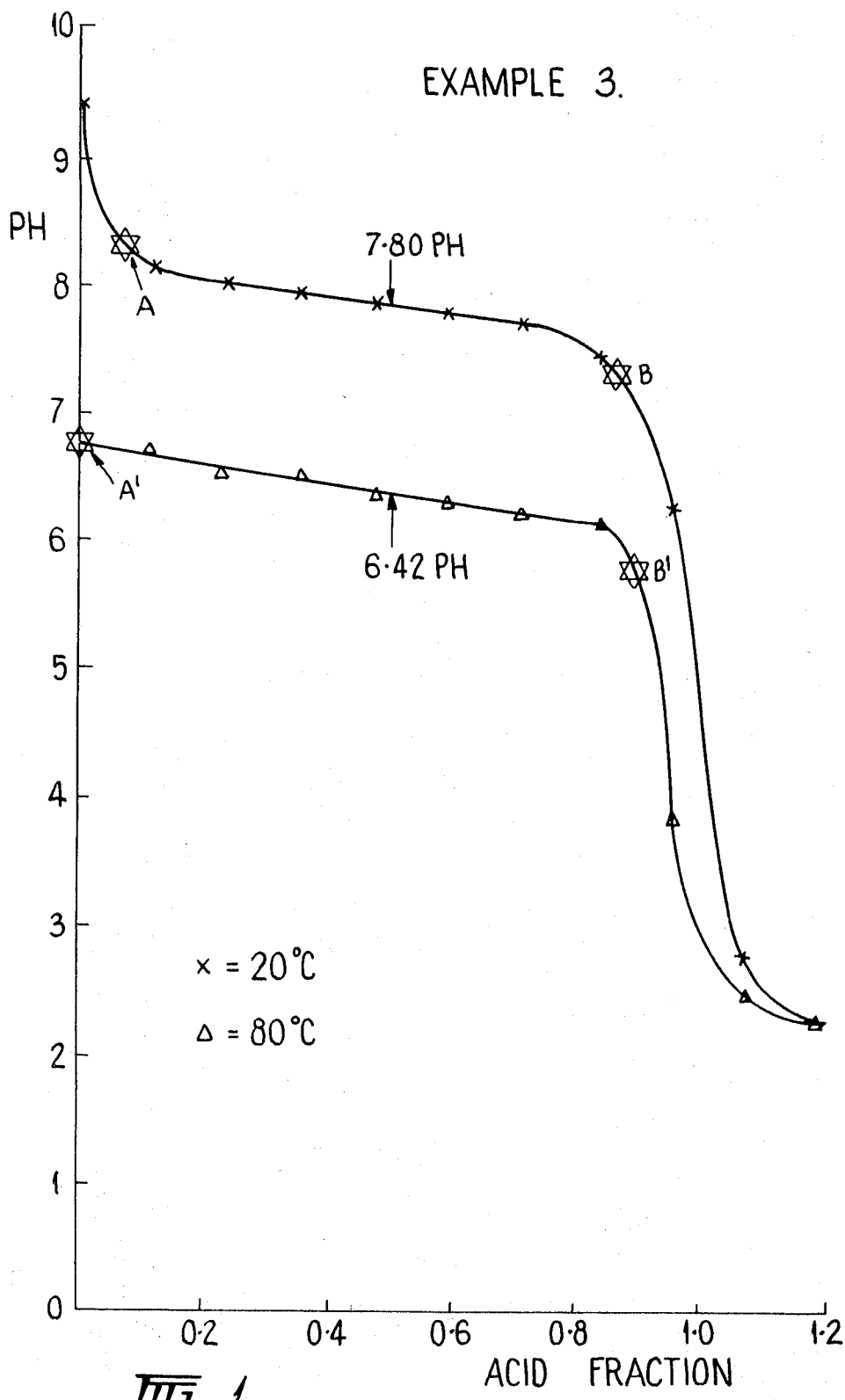

United States Patent

[11] 3,619,394

| [72] | Inventor | Hendrik Adriaan Jacobus Battaerd<br>North Clayton, Victoria, Australia |
|------|----------|-----|
| [21] | Appl. No. | 882,496 |
| [22] | Filed | Dec. 5, 1969 |
| [45] | Patented | Nov. 9, 1971 |
| [73] | Assignee | Imperial Chemical Industries of Australia<br>and New Zealand Limited<br>Melbourne, Victoria, Australia |
| [32] | Priority | Dec. 20, 1968 |
| [33] | | Australia |
| [31] | | 48200 |

[54] TRIALLYLAMINE POLYMERIZATION
15 Claims, 4 Drawing Figs.

[52] U.S. Cl. .................................... 204/159.22,
260/2.1 E, 260/80.3 N, 260/89.7 N
[51] Int. Cl. ........................................ C08f 1/16,
C08f 3/84, C08f 15/02
[50] Field of Search .......................... 260/2.1 E,
89.7 N, 80.3 N; 204/159.22

[56] References Cited
UNITED STATES PATENTS

| 2,687,382 | 8/1954 | Butler et al. ................... | 260/260 |
|-----------|--------|----------------------------------|---------|
| 3,057,833 | 10/1962 | Devlin ........................... | 260/82.1 |
| 3,062,798 | 11/1962 | Lovett ........................... | 260/89.7 |
| 3,092,563 | 6/1963 | Agius et al. ................... | 204/158 |

FOREIGN PATENTS

| 907,079 | 10/1962 | Great Britain |
|---------|---------|---------------|
| 939,518 | 10/1963 | Great Britain |

OTHER REFERENCES

Clingman et al., J. Appl. Chem. 13, 1– 6 (1963)
Butler et al., J. Am. Chem. Soc. 71, 3,120– 3,122 (1949)
Butler et al., J. Am. Chem. Soc. 73, 895– 896 (1951)

*Primary Examiner*—Melvin Goldstein
*Attorney*—Cushman, Darby & Cushman

ABSTRACT: This invention relates to a new class of polymeric amines and to a method for their manufacture. More particularly, the invention concerns polyallylamines, especially homo and copolymers of triallylamine and their application in the so-called "Sirotherm" process.

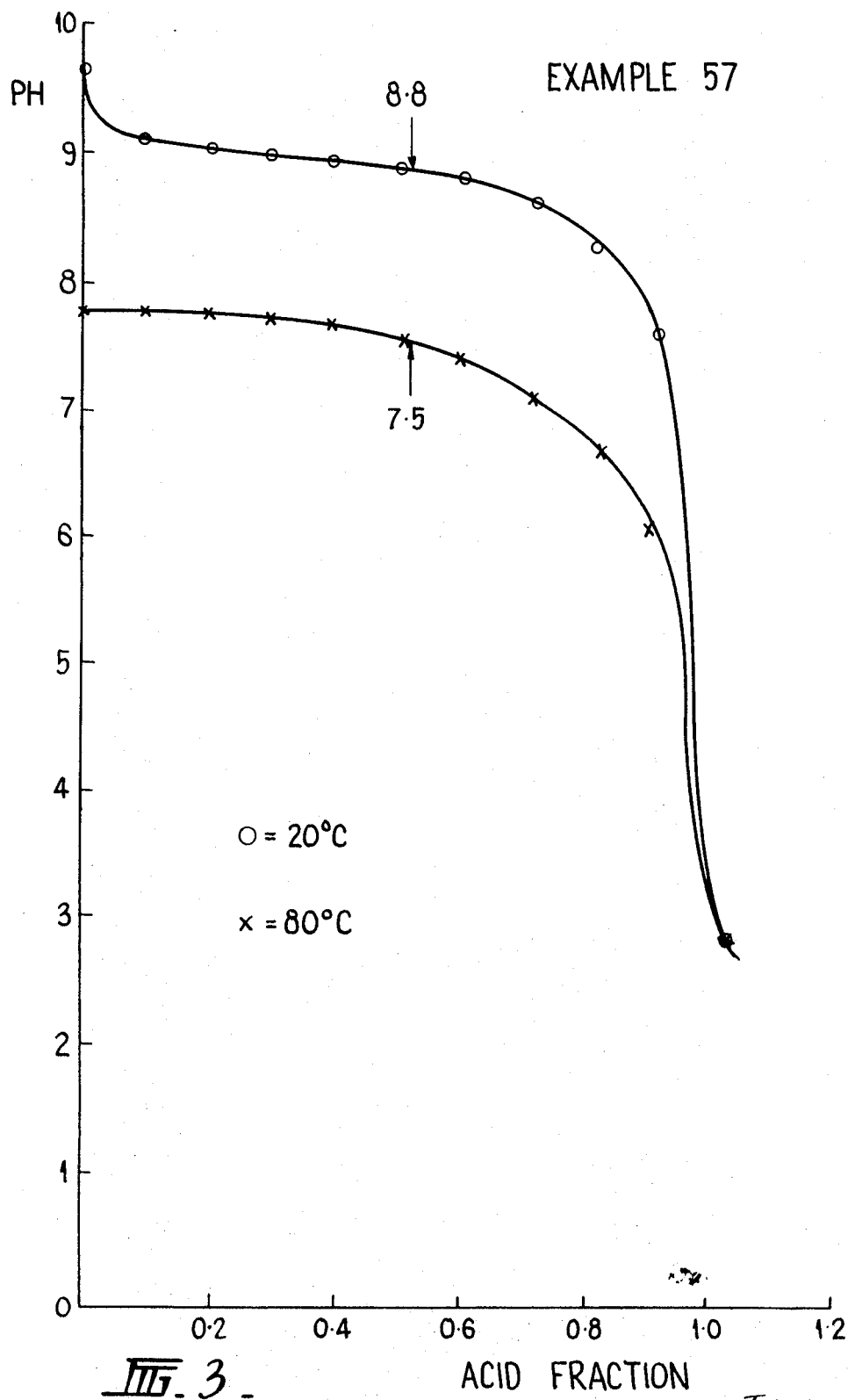

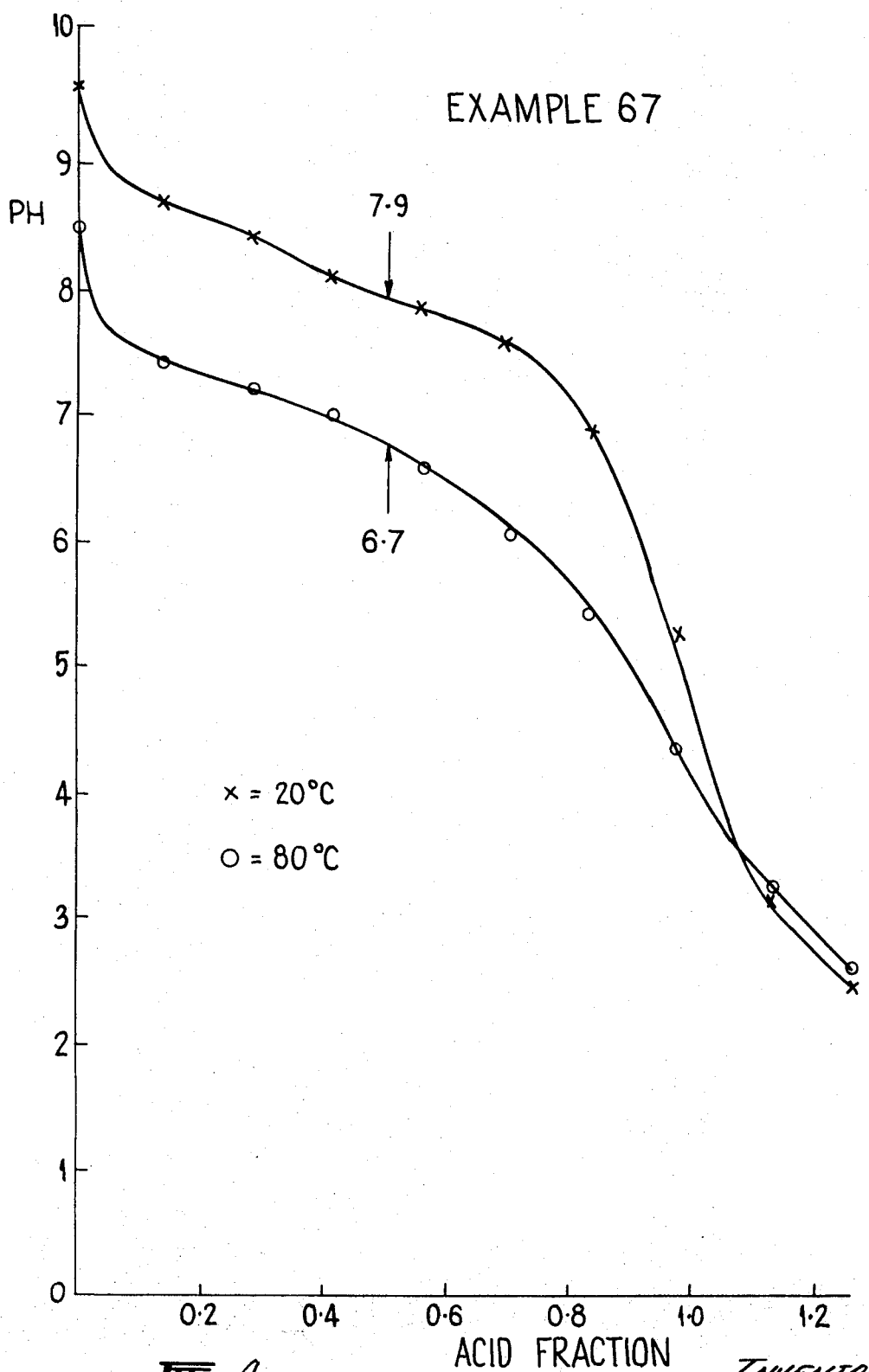

TRIALLYLAMINE POLYMERIZATION

It is known that with free radical initiators allylic compounds polymerize with difficulty only to give low molecular weight products (R.C. Laible, Chem. Rev. 58 (5), 807 (1958)). In this reaction polymerization is inhibited mainly by chain transfer reactions, such as degradative chain transfer. Because of this characteristic, massive amounts of initiator are usually required in allyl polymerizations, the resulting polymers have a low molecular weight and comprise relatively high quantities of terminal catalyst residues.

The free radical polymerization of allyl compounds such as the di- and tri-allyl monomers leads to cyclic structures by intra molecular polymerization as well as to network formation. The other mechanism characteristic of allyl polymerization, namely degradative transfer, is also operative. Consequently cross-linked polymers are obtained which exhibit residual unsaturation as well as measurable quantities of catalyst residues (Encyclopedia of Polymer Science and Technology, 1st Edition, Volume 1, page 755 and following).

The introduction of amino groups into allylic monomers further decreases the reactivity of the allyl bond in polymerization reactions. Thus, while for example allyl esters can be polymerized by heating in the presence of air, allylamine, diallylamine and triallylamine do not polymerize under conditions applicable to the allyl esters.

It was, however, found that allylamines can be polymerized under special conditions, e.g. in the gas phase (U.S. Pat. No. 3,062,798) or copolymerized when dialkyl peroxides are used as catalysts in conjunction with selected solvents (U.S. Pat. No. 3,057,833).

U.K. Pat. No. 907,079 proposes the production of homopolymers and copolymers of the N-triallylamine salts and N-tetraallyl ammonium salts using massive quantities of initiator; more specifically anion exchange resins can be made by polymerizing tetra-allyl ammonium chloride and triallylamine hydrochloride with large amounts of a free radical initiator (British Pat. No. 939,518).

These prior art polymers and processes have certain disadvantages. High doses of catalysts are required, e.g. in British Pat. No. 939,518 between 5 and 20 parts per 100 parts of monomer; consequently large amounts of heteroatoms are retained in the polymer, e.g. 2½ to 5 percent by weight — $SO_3H$ groups, most probably chemically bound, in the polymer. This represents 0.3 to 0.6 meg./g. of a residual acid function which is undesired in a base resin. In line with this, prior art triallylamine resins so prepared have a neutralization capacity of less than 5.5 meq./g., well below their theoretical capacity. Furthermore these prior art triallylamines exhibit two other properties, somewhat surprising for a polymer of a trebly unsaturated compound; they have a lower than expected degree of cross-linking and a higher than expected degree of unsaturation. This has been explained, at least in qualitative terms, by Butler; he has shown (J.A.C.S., 77, 1767-9 (1955)) that monomers containing two allyl groups are subject to a cyclic polymerization which consumes one allyl group and leaves only one double bond per molecule for reaction in linear polymerization; a linear (or a largely linear) polymer results which is water soluble, i.e. nonswelling and not cross-linked. At least three allyl groups per monomer unit thus are required to attain cross-linking and insolubility. For the latter, triallyl resins, it has furthermore been postulated that an "incestuous" tendency to interpolymerization exists (R.C. Laible, Enc. of Polymer Science and Technology I, p. 758) which causes a reduction in the number of double bonds available for cross-linking.

For certain processes the presence of even relatively small amounts of anionic groups in the amine resins is detrimental. Thus it has been found that the prior art polymers of triallylamine are thermally unstable. Thermal stability is, of course, a somewhat relative property. A convenient quantitative measure thereof may be derived from the differential scanning calorimeter, e.g. a Perkin Elmer DSC-1. Prior art polymers of triallylamines, when heated in this instrument at the rate of 64° C./min., decompose below 300° C. as evidenced by a decrease in their infrared absorption peaks at 910 and 980 cm.[11].

From the point of view of use of these polymers in the so-called "Sirotherm" process, which is described in the publications:

"The 'Sirotherm' Demineralization Process—an Ion Exchange Process with Thermal Regeneration," Part 1. J. Inst. Engr. Aust. (1965) 37, 193;

"An Ion Exchange Process with Thermal Regeneration," Aust. J. Chem. (1966), 19, 561 (Part II), 589 (Part III), 765 (Part IV) and 791 (Part V);

"Thermally Regenerated Ion Exchange Process—An Aid to Water Management," J. Water Poll. Control Feed (1966), 38, 1782; and Australian Pat. No. 274,029, it is even more significant that polymers of triallylamines made according to the prior art, e.g. British Pat. No. 939,518, are unsatisfactory. They have low capacities and, more importantly, do not satisfy the criterion for a satisfactory "Sirotherm" anionic resin, that the titration (pH) curve obtained on neutralization with a strong acid under standard conditions exhibits a pH plateau, i.e. an almost steady pH value over a major part of the titration curve (Australian Pat. No. 274,029). Weiss (Australian Journal of Chemistry, 1968, Vol. 21, pp. 2,703-2,710, "An Ion Exchange Process with Thermal Regeneration," Part VI) has shown that only resins with this characteristic are useful in his thermocycle. While we do not wish to be bound by theory we consider that the presence of the initiator residues, e.g. the residual sulphonic acid groups, may set up ionic grids which inhibit access and ion exchange and thus affect not only capacity but also thermal stability.

Surprisingly we have now found that these difficulties can be overcome and allylamine salts, particularly di- and tri-allylamine salts, can be satisfactorily homo- and copolymerized with other allylamine salts when ionizing radiation is used to activate polymerization.

It will be understood by those skilled in the art that, in order to polymerize in aqueous media, these amines must be present as salts. Hence all references in this specification to the polymerization of allylamines, even when not specifically described as salts, are to the amines in their polymerizable state. In aqueous media this will be as salts; only in certain concentrated hydrotropic solvent media such as p-toluenesulphonates can the allylamine bases be polymerized; these processes are exceptional but are embraced by the present invention. We have discovered that the polymers so obtained have a free base content close to theory, e.g. in the case of triallylamine homopolymer between 10 and 10.9% by weight of elemental nitrogen determined by elemental analysis are almost free from catalyst residues, i.e. contain less than 0.5% combined of the heteroatoms sulphur, chlorine or oxygen (excluding, however, the oxygen attributable to the water content of the polymer); they are more highly cross-linked than the prior art poly(triallylamines) as evidenced by a low water regain value as defined below (swelling characteristics) between 0.1 and 1.3 g. per g. of resin for particles e.g. of mean diameter from 0.5 to 10 micron and the free bases of our polymers are stable as defined below on heating in a differential calorimeter up to 380° C., when heated at the rate of 64° C./minute. Furthermore in particulate form they have a high equilibrium capacity, between 6.5 and 8.6 meq./g. of resin, and when used in the "Sirotherm" process, satisfy the requirements for successful thermal cycling processes, namely they exhibit a pH plateau in their titration curve, which is characteristic of a virtually monofunctional polymeric amine, and are extremely resistant to disintegration, when used in a succession of several thousand ion exchange cycles.

The water regain value is defined as the amount of water in grams per gram of severely dried resin absorbed when the resin is equilibrated in distilled water. By severe drying we mean drying at 60° C. and 0.05 mm. Hg pressure over $P_2O_5$ for 24 hours. The polytriallylamine (free base) is considered stable at a given temperature if, after heating to said temperature at the stated rate, 6 mg. of the treated resin, finely ground with 0.2 g. of dry KBr, formed under pressure into a disc and analyzed by infrared spectroscopy shows substantially no change in its absorption peaks at 910 and 980 cm.¹¹ respectively.

Accordingly we provide a polymer comprising between 3 and 100 mole percent of triallylamine and a balance of at least one allylamine comer selected from the group consisting of the compounds of the formulae:

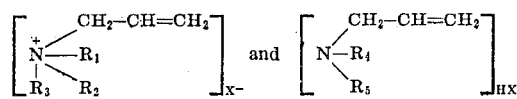

wherein $R_1$, $R_2$, $R_3$, $R_4$ and $R_5$ each separately, may be hydrogen, alkyl, allyl or aryl and at least one of $R_4$ and $R_5$ is hydrogen or alkyl and X is a monovalent anion of a strong acid or the monovalent equivalent of a multivalent anion and wherein the polymer has a total content of chlorine, sulphur and oxygen other than oxygen bound in water of less than 0.5% by weight and a high degree of stability characterized in tat on heating from 20° to 380° C. at the rate of 64° C./minute the infrared absorption spectrum at the peaks 910 cm.¹¹ and 980 cm.¹¹ remains substantially unchanged.

Accordingly we also provide a substantially pure polymer of triallylamine having a free amine base content expressed as percent elemental nitrogen determined by elemental analysis between 10 and 10.9% by weight, a total content of chlorine, sulphur and oxygen other than oxygen bound in water of less than 0.5% by weight and a high degree of thermal stability characterized in that, on heating from 20° to 380° C. at the rate of 64° C./minute, the infrared absorption spectrum at the peaks 910 cm.¹¹ and 980 cm.¹¹ remains substantially unchanged.

We also provide a substantially pure polytriallylamine as above defined characterized further in that its titration (pH) curve on neutralization with a strong acid under standard conditions exhibits a pH plateau between two points embracing at least 70 mole percent of the polymer such that the pH change over said plateau is less than 1 unit. The standard conditions for neutralization are described in example 71.

Yet a further characteristic of the polymer provided is that in particulate form it has in respect of the anion of a strong acid an equilibrium capacity between 6.5 8.6 meq./per gram of dry resin.

The present invention includes copolymers consisting of from 10 to 95 mole percent of triallylamine and a balance of at least one allylamine comer selected from the group consisting of the compounds of the formulas:

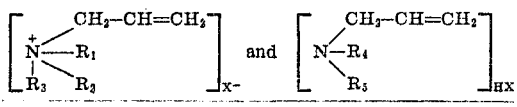

wherein $R_1$, $R_2$, $R_3$, $R_4$ and $R_5$ each separately may be hydrogen, allyl, alkyl or aryl and at least one of $R_4$ and $R_5$ is hydrogen or alkyl and X is a monovalent anion of a strong acid or the monovalent equivalent of a multivalent anion and wherein the copolymer has a total content of chlorine, sulphur and oxygen other than oxygen bound in water of less than 0.5% by weight and a high degree of stability characterized in that on heating from 20° to 380° C. at the rate of 64° C./minute, the infrared absorption spectrum at the peaks 910 cm.¹¹ and 980 cm.¹¹ remains substantially unchanged. By "-monovalent equivalent of a multivalent anion" we mean that the valency of a multivalent anion, e.g. sulphate or phosphate, may be satisfied by the corresponding multiple of cations, e.g. two or three quaternary nitrogens.

Furthermore the present invention includes copolymers consisting of from 85 to 97 mole percent of triallylamine (salt) mer units and a balance of a diallyl comer of the formula $RN(CH_2-CH=CH_2)_2$ or a salt thereof with an acid HX, where R is hydrogen or lower alkyl, preferably methyl, and X is as defined above and wherein the copolymer has a total content of chlorine, sulphur and oxygen of less than 0.5% by weight and a high degree of stability characterized in that on heating from 20° to 380° C. at the rate of 64° C./minute the infrared absorption spectrum at the peaks 910 cm.¹¹ and 980 cm.¹¹ remains substantially unchanged.

Our invention also includes copolymers consisting of from 3 to 15 mole percent of triallylamine (salt) mer units and a balance of a diallyl comer of the formula $RN(CH_2-CH=CH_2)_2$ or a salt thereof with an acid HX, where R is hydrogen or lower alkyl, preferably methyl and X is as defined above and wherein the copolymer has a total content of chlorine, sulphur and oxygen of less than 0.5% by weight and a high degree of stability characterized in that on heating from 20° to 380° C. at the rate of 64° C./minute the infrared absorption spectrum at the peaks 910 cm.¹¹ and 980 cm.¹¹ remains substantially unchanged.

These copolymers having a major or minor proportion of triallylamine are similar to pure polytriallylamines in their use in the "Sirotherm" process, i.e. they all exhibit a titration curve having a pH plateau as defined above. They are also useful in conventional ion exchange processes such as the deacidification of industrial waste. In particulate form they have an equilibrium capacity in respect of the anion of a strong acid in the range between 6.5 and 8.6 meq./g. of dry resin. This equilibrium capacity is higher than that of the conventional poly(alkylaminomethyl styrenes). Our copolymers are also useful in applications based on ion exchange chromotography.

Yet another form of all of these copolymers are those in which a high proportion, preferably in excess of 80% of the nitrogen atoms, is quaternized. They, again, are useful for conventional deacidification and demineralization; their special merit is that they combine high capacity and antifouling properties.

While we do not wish to be limited by hypotheses we consider that the lower degree of residual saturation in our triallylamine homo- and copolymers and their high degree of cross-linking characterized by the low water regain and their high thermal stability, are consistent with network formation rather than Butler's cyclic polymerization and Laible's interpolymerization.

A comparison of the characteristics of prior art and our polytriallylamines is given in table I and a comparison of the respective titration curves is given in FIGS. 1–4 inclusive.

We also provide a process of manufacturing a substantially pure polymer consisting of from 3 to 100 mole percent of triallylamine and a balance of at least one other allylamine derivative selected from the group consisting of the compounds of the formulas:

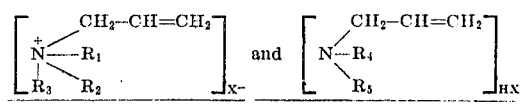

wherein $R_1$, $R_2$, $R_3$, $R_4$ and $R_5$ each separately may be hydrogen, allyl, alkyl or aryl and at least one of $R_4$ and $R_5$ is hydrogen or alkyl and X is a monovalent anion of a strong acid or the monovalent equivalent of a multivalent anion which process comprises exposing said allylic monomer or monomers to high energy radiation at a temperature between −80° and +120° C., preferably between 10° and 40° C., and isolating the polymer salt so formed. The acid HX should be a strong acid; HCl, $H_2SO_4$, $H_3PO_4$ and $Cl_3C.COOH$ are suitable.

Our preferred process is the homopolymerization of triallylamine to substantially pure poly(triallylamine).

Accordingly we provide furthermore a homopolymerization process under irradiation as hereinbefore described wherein the monomer is a triallylamine salt and the resulting polymer is poly(triallylamine).

Other preferred processes comprise copolymerizing under irradiation as described above a diallylamine salt of the formula $RN(CH_2-CH=CH_2)_2 \cdot HX$ wherein R and X are as above defined, and a triallylamine salt in the proportions of the preferred copolymers above defined.

By high energy radiation we mean radiation having a wavelength of less than 100 Angstrom, in particular gamma- and beta-rays derived from isotopes or in the form of fast electrons such as produced by a Van de Graaff generator and an electron accelerator. Other sources of ionizing or high energy radiation are known in the art, e.g. from British Pat. No. 801,528, page 1, lines 49–56; these include neutrons, accelerated heavy particles and X-rays or mixtures of them. A convenient practical source of high energy radiation is a Cobalt 60 source.

The dose rate of irradiation controls the rate of initiation of the polymerization, but has little effect on the properties of the polymer formed. Dose rates between 10 rads/hr. and 5 megarads/hr. are operative and rates between 100,000 rads/hr. and 1 megarad/hr. are convenient in practice. However, the total dose delivered to the polymerization mixture affects the yield as well as the physical properties of the polymer produced. Doses from 3 megarad up to 20 megarad are operative; optimum yield of polymer is usually achieved at 5 to 15 megarad. At doses above 10 megarad the polymer formed has reduced residual unsaturation, possibly due to further crosslinking of the resin, as shown by the reduced water uptake values of the resin.

Radiation, usually and preferably, is carried out in an inert atmosphere such as nitrogen or argon. The presence of air does not stop the polymerization, but a reduction in yield and capacity was observed.

For use as ion exchange resins the polymers and copolymers of this invention must be produced within controlled particle size ranges. For this purpose precipitation polymerization and dispersion polymerization are preferred.

The precipitation polymerization of a triallylamine salt, e.g. the hydrochloride comprises polymerizing the monomer under irradiation in a binary liquid mixture consisting of a solvent for the monomer salt and the polymer salt such as water, and a nonsolvent for the polymer salt such as dioxan or acetone; this leads to a product consisting of uniform spherical particles of a mean diameter from 0.5 to 10 micron, depending on the choice of the concentration of the monomer and the ratio and type of solvent to nonsolvent. Copolymers of triallylamine with another allyl comer of similar particle size may be prepared in binary liquid systems in the same manner as that used for the manufacture of the homopolymer. For the system water-dioxan suitable ratios of solvent to nonsolvent are from 0.2:1 to 1.5:1; in the system water-acetone suitable ratios of solvent to nonsolvent are from 0.05:1 to 0.8:1. When a homopolymer of triallylamine is prepared using water as the solvent and acetone as a nonsolvent, typical ratios of water to acetone are 0.0625:1 and 0.6:1. When a copolymer of triallylamine and another allyl comer is prepared using this system a typical ratio of water to acetone is from 0.2:1 to 0.6:1. Solvents suitable for the monomer salts and polymer salts are for example water, methanol, ethanol, dimethyl formamide, dimethyl sulphoxide and other aprotic solvents. Nonsolvents suitable for the polymer salts of this process are exemplified by, but not limited to, dioxan, THF, acetone, methyl ethyl ketone, methyl butyl ketone. Other solvent pairs will be obvious to those skilled in the art.

Accordingly we provide a process for the precipitation polymerization of triallylamine or a triallylamine salt to form a polymer of quasispherical particles having a mean diameter from 0.5 to 10 microns which process comprises polymerizing the monomer under irradiation in a binary liquid mixture consisting of water and acetone.

We also provide a process for the precipitation copolymerization of mer units of triallylamine or a triallylamine salt with another allyl or allyl salt comer as hereinbefore defined to form a copolymer of quasispherical particles having a mean diameter from 0.5 to 10 microns which process comprises copolymerizing the monomers under irradiation in a binary mixture consisting of water and acetone.

For larger beads, equivalent to the conventional ion exchange resins, the dispersion polymerization process is preferred. For example a dispersion of an aqueous triallylamine hydrochloride solution in benzene stabilized with ethyl cellulose when radiated at room temperature with $Co^{60}$ gamma-rays, will give a high yield of ion exchange beads with a capacity of 6.9 meq./gr. The size of the beads depends on the concentration of ethyl cellulose, the triallylamine hydrochloric solution, the stirring rate and the geometry of the reaction vessel. Beads between two 00 mesh BSS and 10 mesh BSS can easily be achieved. The choice of suspension medium is not narrowly critical, provided the medium is not miscible with the triallylamine hydrochloride solutions. The choice of the stabilizer is not critical; most surfactants used in dispersion polymerization, e.g. hydrocarbon soluble amines or quaternary ammonium terminated surface active agents as well as cellulose ethers are suitable.

A specific use for our polytriallylamine and our copolymers of triallylamine and allylamines as above defined is in water purification by the "Sirotherm" process.

Accordingly we also provide, in the known process for the demineralization of water by a mixed bed of weak acid and weak base type ion exchange resins in which the mixed bed is regenerated by eluting it with water or a saline solution at a temperature exceeding that employed during the adsorption stage, said weak acid having a titration curve at the temperature of the adsorption stage such that some portion of it falls within the area defined by the titration curves of the weak base resin at the temperatures of the adsorption and elution stages respectively and said weak base having a titration curve with an almost steady pH value over a major portion of the titration curve, which curve is displaced to a more acid position by elevation of the temperature, the improvement which consists in using as the weak base resin a polytriallymine or copolymers of triallylamine and an allylamine as above defined; preferably the resin is in the form of quasispherical particles of mean diameter from 0.5 to 10 microns.

A particularly suitable form of combining weak acid and weak base resins is described in Australian Pat. Application No. 30165/67, filed 22nd Nov., 1967 in the name of Commonwealth Scientific and Industrial Research Organization.

Whilst our polymers and copolymers are eminently suitable and are specifically devised for use as a component for combining with weak acid resins as described in Australian Pat. Application No. 30165/67, we have established that prior art resins such as those described in British Pat. Specification 939,518 whether now in coarse form or ground to a fine powder are not suitable for this purpose. This is attributed to the fact that such resins do not exhibit a titration curve having a plateau as hereinbefore defined.

Figure 2:
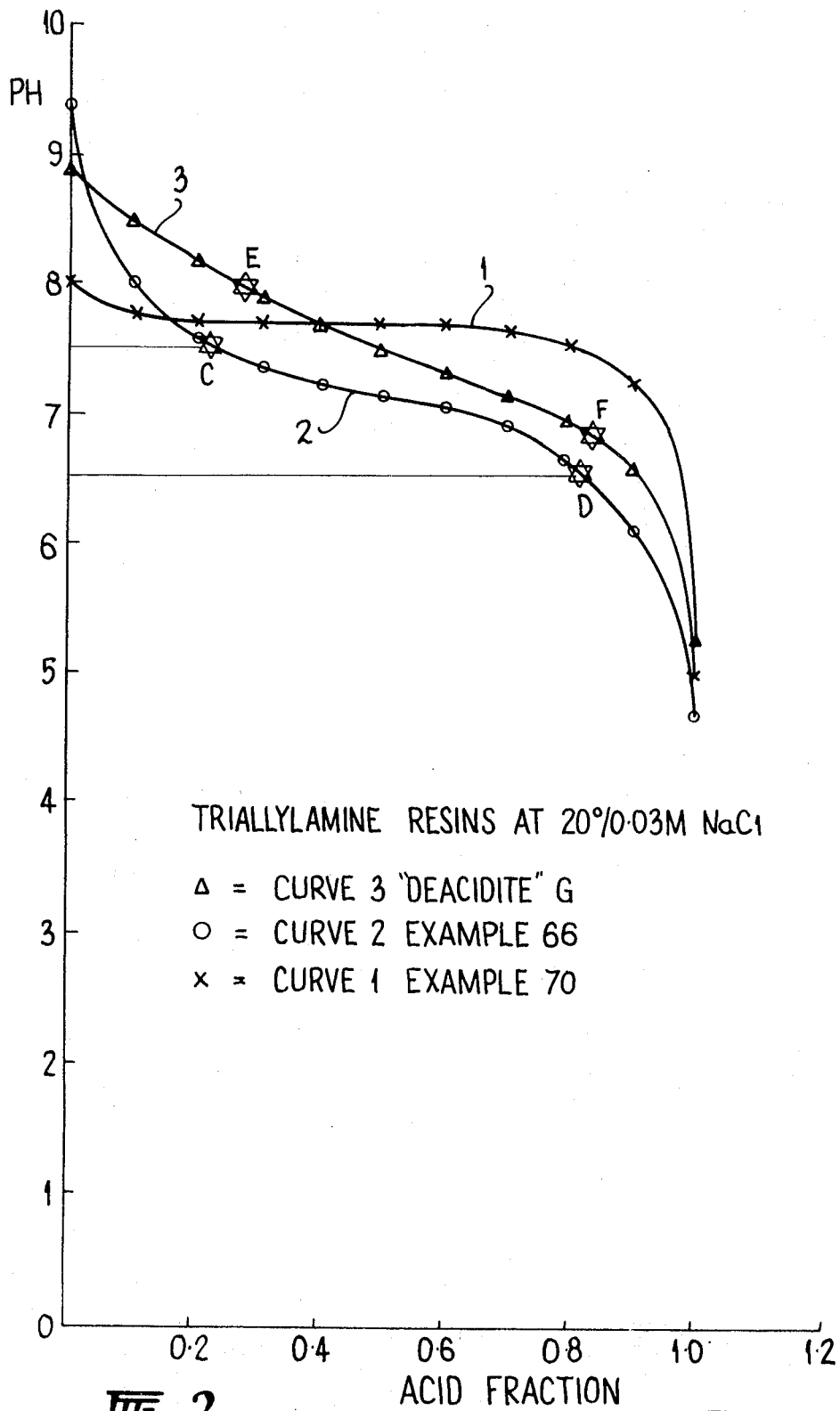

Typical titration curves of polymers and copolymers according to this invention suitable for the "Sirotherm" process are shown in FIGS. 1 and 2. FIG. 1, curves 1 and 2 show the titration curves of the resin of example 3 determined at two temperatures (20° C. and 80° C.) as described in example 71. They exhibit the typical plateau between points A and B and A' and B' respectively which is characterized in that more than 70 mole percent of the resin, in fact in this instance at least 78% between A and B and 89% between A' and B', is neutralized between these points and in that the pH range between them is no more than 1 pH unit. Furthermore, curves 1 and 2 of FIG. 1 show the characteristic pH difference at the 50 mole percent neutralization point, which should exceed 1 pH over a temperature difference from 20° to 80°C.

Obviously the positions of A and B are not highly critical; they could be shifted to the left or right; as long as two points satisfying these conditions can be found on the flattest part of the curve the resin is operative.

FIG. 2, curves 1, 2 and 3 again were determined as described in example 71. Curve 1, given for comparison, is similar to curve 1, FIG. 1 and was prepared from a typical polymer according to the invention, namely example 70.

Curve 2 in FIG. 2 is typical of a prior art polytriallylamine according to British Pat. No. 939,518 example 1, repeated in our example 66. The flattest point in this curve over 1 pH unit, defined by points C and D embraces less than 70%, actually about 58 mole percent, of the resin.

Curve 3 in FIG. 2 represents a typical prior art, commercially available poly(alkylaminomethyl styrene) resin; its flattest part over 1 pH unit, defined by points E and F, embraces less than 70, namely 52 mole percent.

FIG. 3, curves 1 and 2 are typical of the titration curves of copolymers according to this invention, example 57. As in FIG. 1 the titration curves 1 and 2 were determined at two different temperatures (20° and 80° C.). They exhibit the same typical plateaus and pH displacement over the temperature differential.

FIG. 4, similar to FIG. 1, curves 1 and 2 show the titration curves of prior art polytriallylamine (according to British Pat. No. 939,518 repeated by us as example 67) at 20° and 80° C. respectively.

Our invention is now exemplified by but not limited to the following examples.

EXAMPLES 1 TO 65 a. Preparation of Triallylamine Salts

Care was taken in the neutralization of triallylamine to avoid addition of HCl across the double bond. Consequently triallylamine free from covalently bonded chlorine was obtained by the methods set out below. The abbreviation TAA in this specification stands for triallylmine.

i. Triallylamine Solution in $H_2O$ 500 ml.=401.5 g. of commercial triallylamine (density 0.803 g./ml., color: orange) was placed in a one litre round bottomed flanged flask, fitted with an anchor stirrer, thermometer and one open neck. The flask was surrounded by an ice/water/salt mixture kept at approximately −10° C. Stirring was commenced at a fast rate and when the temperature in the flask had dropped to 0° C., 251.6 mls. of concentrated hydrochloric acid solution (laboratory reagent quality, density 1.18 g./ml., 36% HCl w/w) was added dropwise under continued vigorous stirring over 3 hours and kept cool, between 0° C. and 5° C. After reaching room temperature the aqueous triallylamine hydrochloride solution had a volume of 684 ml., corresponding to approximately 75% w/v of triallylamine hydrochloride in water. Color: dark orange, pH 5.2, molarity 4.3 M.

ii. Solid, Dry Triallylamine Hydrochloride 100 ml. of commercial triallylamine (density 0.803 g./ml.) and 400 ml. of anhydrous diethylether were placed in a 700 ml. round bottomed flanged flask fitted with an anchor stirrer, thermometer, gas inlet tube and $CaCl_2$ guard tube. A clear, water white solution was obtained. The contents of the flask were surrounded by an acetone/dry ice mixture at −78° C., stirred and, when the temperature in the flask had reached −60° C. a moderate stream of dry HCl gas was passed through the solution over 1 hour while maintaining the temperature at −50° to −60° C. A good crop of white crystals was obtained, quickly filtered on the water pump and given two rapid washes with ether before being dried at room temperature in vacuo in a desiccator. The white crystals of triallylamine hydrochloride were extremely hygroscopic; they were stored over silica gel in a desiccator.

Both forms of triallylamine hydrochloride, aqueous solution and solid crystals, were suitable for the polymerization experiments.

In the manner described under (i) above triallylamine salts of sulphuric, nitric, trichloroacetic and phosphoric acid having the empirical formulae
$(TAA)_2H_2SO_4$, $TAA.HNO_3$ $TAA.CCl_3COOH$, $TAA.H_3PO_4$
were prepared. The following products were obtained:

$(TAA)_2H_2SO_4$
59 ml. of 48% $H_2SO_4$ were added;
140 ml. (150.6 g.) of $(TAA)_2H_2SO_4$ were obtained;
Density: 1.08 g./ml.
pH: 5.2
Molarity: 2.1 M
Concentration: 77% w/v, Color: clear brown.
$TAA.HNO_3$
71 ml. of 52% $HNO_3$ were added;
159 ml. (166.8 g.) of $TAA.HNO_3$ solution were obtained;
Density: 1.05 g./ml.
pH: 5.0
Molarity 3.8 M
Concentration: 75% w/v, Color: clear brown.
$TAA.CCl_3COOH$
157 ml. of 61% $CCl_3COOH$ solution were added;
239 ml. (2 73.6 g.) of $TAA.CCl_3COOH$ solution were obtained;
Density: 1.15 g./ml.
pH: 4.6
Molarity: 2.4 M
Concentration: 74% w/v, Color: clear brown.
$TAA.H_3PO_4$
102 ml. of 56% $H_3PO_4$ were added;
177 ml. (202.5 g.) of $TAA.H_3PO_4$ solution were obtained;
Density: 1.14 g./ml.
pH: 4.7
Molarity: 3.3 M
Concentration: 77% w/v, Color: brown with some white sediment.

b. Polymerization Procedure

Aqueous solutions of the allylamine salts described above (75% w/v, pH 5.3, 4.3 M in the case of triallylamine hydrochloride) were placed in a 50 ml. test tube fitted with a tap and stopper; wherever solvents were used, these were added under gentle stirring. The pH was then adjusted to the desired value with concentrated acid, e.g. HCl wherever desired, and, unless stated otherwise, the solution was freeze-degassed twice at 0.01 mm. Hg pressure using liquid nitrogen as coolant. The samples were then irradiated at the temperature and to the doses stated in table II. Irradiation was carried out with a circular array of 8 $Co^{60}$ sources of 250 curies each delivering a total nominal dose rate of $1.7 \times 10^5$ rads/hour. The polymers obtained were washed with 2N HCl until the effluent was free of detectable monomeric amine (24 hours), then with 0.5N NaOH until the effluent was free of detectable chloride (48 hours) and then with doubly distilled water until the effluent had a pH of less than 6.4 (48 hours). The washing rate in all cases was approximately 200 ml./hour. The polymers were then dried at 65° C. in vacuo for 36 hours and weighed. The dose rate was determined by ferrous sulphate dosimetry as described by Battaerd et al. in Reviews of Pure and Applied Chemistry, 16, p. 83, 1966 with $G_{Fe^{++}}=15.6$ The principal parameter of reaction conditions under which satisfactory polymers were obtained, namely irradiation dose (examples 1 to 5 inclusive), pH (examples 6 to 11 inclusive), temperature (examples 14 to 19 inclusive), solvent (examples 20 to 43 inclusive), monomer concentration (examples 33 to 43 inclusive), type of monomer salt (examples 46 to 55 inclusive) and type of polymerization were then determined as set out in table II. The main effects observed are given in table III, namely physical appearance, yield, equilibrium capacity in meq./g. (milliequivalent of exchanged ion per gram of dry copolymer, determined by the method described by F. Helfferich "Ion Exchange," McGraw-Hill Book Company, 1962, p. 91) nitrogen content on free base of dry resin by elemental analysis and percent capacity attained of theoretical maximum (in meq./g.) corresponding to available nitrogen. The latter figure is calculated as $$\frac{\text{Meq./g. attained}}{\text{Theoretical meq./g. corresponding nitrogen determined by element analysis}} \times 100$$

nitrogen content for pure polytriallylamine base, with which the actual content is to be compared is 10.2%.

Examples 56 to 65 inclusive and 73 to 75 inclusive

Hydrochloric salt solutions of allylamine, diallylamine, triallylamine and methyldiallylamine were prepared as described in example 1.

With the apparatus the general conditions as set out in example 1 copolymers were prepared as detailed in table IV. The samples were not degassed in these polymerizations. Copolymers of high equilibrium capacities were obtained.

Examples 66 to 70 inclusive

Dispersion polymerizations of triallylamine were carried out in a 500 ml. glass jacketed, flanged reactor. The lid of the reactor was fitted with a condenser, thermocouple jacket, stirrer gland and stirrer and an inlet for purging with nitrogen. The jacket was connected to a thermostat allowing control of the temperature of the reactor.

The reactor could be used with conventional initiators, or irradiated with $Co^{60}$ gamma-rays. Experimental details and results are set out in tables V and VI.

Prior art examples 66 to 68 inclusive (all based on example 1 of British Pat. Specification 939,518) show that yields, capacity and available nitrogen are substantially below those obtained by radiation polymerization. The prior art examples 66 to 68 inclusive also contained sulphur and had a high ash content.

Example 71

The pH titration curves of the resins tested were all determined in the following manner.

To ten 2 oz. "Clinbritic" (Registered Trade Mark for serum bottles with serum injection stoppers) bottles 0.1 N hydrochloric acid in 0.03 molar sodium chloride solution was added in progressive increments of 2 mls., so that the bottles contained 0, 2, 4, 6, 8, 10, 12, 14, 16 and 18 mls., the volume of each bottle was made up to 20 mls. with 0.03 molar sodium chloride solution and 200 mg. of the resin was added to each. The bottles were then equilibrated at 20° C. for 24 hours with gentle shaking. Sufficient liquid was then removed (by filtration) to determine the pH of each bottle, taking care that no variation of temperature occurred during the filtration.

The results were plotted as mole percent neutralization against the pH. The mole percent neutralization was calculated on the capacity of the resin present. Where desired, the experiment was carried out at two temperatures, 20° C. and 80° C.

Example 72

The following example demonstrates that the presence of water is required for radiation polymerization.

10 grams of dry triallylamine hydrochloride, prepared as described in example 1 were added together with 150 ml. of dry methylethyl ketone to a 500 ml. round bottomed flask provided with a stirrer. The flask and contents were irradiated at 20° C. to a total dose of 11.0 megarads.

After radiation, the resulting clear yellow liquid was added to 5 litres of acetone. No polymer precipitated.

On repeating the experiment, with 2.5 mls. of water added, a fine particulate polymer was obtained, which after washing successively with acetone, water 1N NaOH and, again, water, was converted to the free base form.

After drying the weight of the polymer corresponded to a yield of 81.3%, similar to that obtained in the previous examples. The presence of water is thus essential for the polymerization.

TABLE I.—ELEMENTAL ANALYSIS OF POLY-TRIALLYLAMINES

| | (1) N, percent | (2) C, percent | (3) H, percent | (4) O,[a] percent | (5) Percent $H_2O$ [b] | (6) Nett percent oxygen [c] | (7) Sulphate (Na), percent | (8) Cl, percent | (9) S, percent | (10) Capacity, meq./g. | (11) ΔpH [d] | (12) Water regain [e] |
|---|---|---|---|---|---|---|---|---|---|---|---|---|
| Theoretical for poly-triallylamine free base | 10.22 | 78.83 | 10.95 | | | 0 | | | | 7.1 | | |
| Poly-triallylamine free base form (Example 10) | 10.3 | 77.18 | 11.13 | 2.26 | 2.3 | 0.21 | 0.19 | <0.2 | | 6.8 | 1.4 | [f] 0.9 |
| Poly-triallylamine free base form, B.P. 939,518 (Example 67) | 8.53 | 66.30 | 9.59 | 7.72 | 2.5 | 5.50 | 2.64 | 2.2 | 1.46 | 5.5 | 1.2 | [f] 2.8 |

[a] Total oxygen, i.e. oxygen in polymer plus oxygen due to water (col. 5).
[b] Percent water determined by severe drying as above defined
[c] Determined by subtraction of oxygen content attributable to water (col. 5) from total oxygen (col. 4).
[d] 20° C.–80° C., at titration curve midpoint.
[e] G. $H_2O$/g. dry resin.
[f] Determined by method of F. Helfferich.

TABLE II.—REACTION CONDITIONS

| Example No. | Radiation dose, megarads | pH | Temp., ° C. | Solvent | Second solvent | Monomer Type | Concentration TAA, percent w./v. | Type of polymerisation | Degassed. |
|---|---|---|---|---|---|---|---|---|---|
| 1 | 0.75 | 5.2 | 20 | | | 10 mls. of TAA hydrochloride. | 75 | Solution | Yes. |
| 2 | 3 | 5.2 | 20 | | | do | 75 | do | Yes. |
| 3 | 10 | 5.2 | 20 | | | do | 75 | do | Yes. |
| 4 | 15 | 5.2 | 20 | | | do | 75 | do | Yes. |
| 5 | 19 | 5.2 | 20 | | | do | 75 | do | Yes. |
| 6 | 3 | 0.1 | 20 | | | do | 75 | do | Yes. |
| 7 | 3 | 0.3 | 20 | | | do | 75 | do | Yes. |
| 8 | 3 | 1.5 | 20 | | | do | 75 | do | Yes. |
| 9 | 3 | 2.7 | 20 | | | do | 75 | do | Yes. |
| 10 | 3 | 5.2 | 20 | | | do | 75 | do | Yes. |
| 11 | 3 | 5.6 | 20 | | | do | 75 | do | Yes. |
| 12 | 10 | 0.4 | 20 | | | do | 75 | do | Yes. |
| 13 | 10 | 5.6 | 20 | | | do | 75 | do | Yes. |
| 14 | 10 | 5.2 | −78 | | | do | 75 | do | Yes. |
| 15 | 3 | 0.3 | 20 | | | do | 75 | do | Yes. |
| 16 | 3 | 5.2 | 20 | | | do | 75 | do | Yes. |
| 17 | 3 | 0.3 | 50 | | | do | 75 | do | Yes. |
| 18 | 3 | 5.2 | 50 | | | do | 75 | do | Yes. |
| 19 | 3 | 5.2 | 80 | | | do | 75 | do | Yes. |
| 20 | 3 | 5.2 | 20 | 10 ml. acetone | | do | 37.5 | Precipitation | Yes. |
| 21 | 3 | 5.2 | 20 | 10 ml. dioxan | | do | 37.5 | do | Yes. |
| 22 | 3 | 5.2 | 20 | 10 ml. methyl ethyl ketone. | | do | 37.5 | do | Yes. |
| 23 | 3 | 5.2 | 20 | Tetrahydro-furan | | | 37.5 | Solution | Yes. |
| 24 | 3 | 5.2 | 20 | Dimethyl formamide. | | do | 37.5 | do | Yes. |

| Example No. | Radiation dose, megarads | pH | Temp., °C | Solvent [1] | Second solvent [1] | Monomer Type | Concentration TAA, percent w./v. | Type of polymerisation | Degassed |
|---|---|---|---|---|---|---|---|---|---|
| 25 | 10 | 5.2 | 20 | 10 ml. H₂O | | do | 37.5 | do | Yes. |
| 26 | 10 | 5.2 | 20 | 8 ml. H₂O | 2 ml. dioxan | do | 37.5 | do | Yes. |
| 27 | 10 | 5.2 | 20 | 15 ml. H₂O | 4 ml. dioxan | do | 37.5 | do | Yes. |
| 28 | 10 | 5.2 | 20 | 5 ml. H₂O | 5 ml. dioxan | do | 37.5 | do | Yes. |
| 29 | 10 | 5.2 | 20 | 4 ml. H₂O | 6 ml. dioxan | do | 37.5 | do | Yes. |
| 30 | 10 | 5.2 | 20 | 3 ml. H₂O | 7 ml. dioxan | do | 37.5 | Precipitation | Yes. |
| 31 | 10 | 5.2 | 20 | 2 ml. H₂O | 8 ml. dioxan | do | 37.5 | do | Yes. |
| 32 | 20 | 5.2 | 20 | 1 ml. H₂O | 9 ml. dioxan | do | 37.5 | do | Yes. |
| 33 | 7.3 | 5.2 | 20 | 10 ml. dioxan | H₂O nil | do | | | |

| Example No. | Radiation dose, megarads | pH | Temp., °C | Solvent [1] | Second solvent [1] | Monomer Type | Mls. of solution | Concentration [2] | Type of polymerisation | Degassed |
|---|---|---|---|---|---|---|---|---|---|---|
| 33 | 7.3 | 5.2 | 20 | do | H₂O nil | TAA HCl | 10 | 37.5 | Precipitation | Yes. |
| 34 | 7.3 | 5.2 | 20 | 5 ml. dioxan | 15 ml. H₂O | TAA HCl | 5 | 15 | Solution | Yes. |
| 35 | 7.3 | 5.2 | 20 | 4 ml. dioxan | 16 ml. H₂O | TAA HCl | 4 | 12.5 | do | Yes. |
| 36 | 7.3 | 5.2 | 20 | 3 ml. dioxan | 17 ml. H₂O | TAA HCl | 3 | 9.8 | do | Yes. |
| 37 | 7.3 | 5.2 | 20 | 2 ml. dioxan | 18 ml. H₂O | TAA HCl | 2 | 6.8 | do | Yes. |
| 38 | 11.5 | 5.2 | 20 | 10 ml. dioxan | 2 mol. H₂O | TAA HCl | 8 | 30 | Precipitation | Yes. |
| 39 | 11.5 | 5.2 | 20 | do | 4 ml. H₂O | TAA HCl | 6 | 22.5 | do | Yes. |
| 40 | 11.5 | 5.2 | 20 | do | 5 ml. H₂O | TAA HCl | 5 | 18.75 | do | Yes. |
| 41 | 11.5 | 5.2 | 20 | do | 6 ml. H₂O | TAA HCl | 4 | 15 | do | Yes. |
| 42 | 11.5 | 5.2 | 20 | do | 7 ml. H₂O | TAA HCl | 3 | 11.25 | Solution | Yes. |
| 43 | 11.5 | 5.2 | 20 | do | 8 ml. H₂O | TAA HCl | 2 | 7.5 | do | Yes. |
| 44 | 11 | 5.2 | 20 | | | TAA HCl | 10 | 75 | do | Yes. |
| 45 | 11 | 5.2 | 20 | | | TAA HCl | 10 | 75 | do | No.[3] |
| 46 | 10 | 5.2 | 20 | | | TAA HCl | 10 | 75 | do | No.[3] |
| 47 | 10 | 5.2 | 20 | 10 ml. dioxan | | TAA HCl | 10 | 37.5 | Precipitation | No.[3] |
| 48 | 10 | 5.2 | 20 | | | (TAA)₂H₂SO₄ | 10 | 77 | Solution | No.[3] |
| 49 | 10 | 5.2 | 20 | 10 ml. dioxan | | (TAA)₂H₂SO₄ | 10 | 38.5 | Precipitation | No.[3] |
| 50 | 10 | 5.0 | 20 | | | TAA·HNO₃ | 10 | 75 | Solution | No.[3] |
| 51 | 10 | 5.0 | 20 | 10 ml. dioxan | | TAA·HNO₃ | 10 | 37.5 | Precipitation | No.[3] |
| 52 | 10 | 4.6 | 20 | | | TAA·CCl₃COOH | 10 | 74 | Solution | No.[3] |
| 53 | 10 | 4.6 | 20 | 10 ml. dioxan | | TAA·CCl₃COOH | 10 | 37 | Precipitation | No.[3] |
| 54 | 10 | 4.7 | 20 | 4 ml. H₂O | | TAA·H₃PO₄ | 10 | 55 | Solution | No.[3] |
| 55 | 10 | 4.7 | 20 | 10 ml. dioxan | 4 ml. H₂O | TAA·H₃PO₄ | 10 | 32 | Precipitation | No.[3] |

[1] Added to monomer solution.
[2] TAA, weight/volume percent.
[3] Air present.

TABLE III.—POLYMER PROPERTIES

| Ex. No. | Yield, Percent of theory | Capacity, meq./g. | Nitrogen content, percent w./w. | Percent capacity attained of theoretical maximum | Comment |
|---|---|---|---|---|---|
| 1 | 7 | | | | No solid resin, viscous jelly, unsatisfactory. |
| 2 | 46 | 6.73 | 10.6 | 94.7 | Opaque soft solid, satisfactory. |
| 3 | 86 | 6.8 | 10.5 | 95.2 | Opaque hard brittle solid, excellent. |
| 4 | 93 | 6.95 | 10.4 | 97.4 | Do. |
| 5 | 95 | 6.98 | 10.4 | 97.8 | Do. |
| 6 | 23 | 6.5 | *ND | ND | Clear soft jelly, unsatisfactory. |
| 7 | 44 | 6.5 | 10.04 | 93.8 | Clear jelly, satisfactory. |
| 8 | 44 | 6.4 | 10.6 | 88.8 | Do. |
| 9 | 46 | 6.6 | 10.6 | 91.2 | Opaque soft solid, satisfactory. |
| 10 | | 6.8 | 10.3 | 96.7 | Opaque hard solid, excellent. |
| 11 | 21 | 6.9 | ND | ND | Phase separation before polymerisation, unsatisfactory. |
| 12 | 66 | 5.7 | 9.7 | 88.5 | Not quite satisfactory. |
| 13 | 86 | 6.6 | 10.1 | 98.6 | Satisfactory. |
| 14 | 63 | 6.8 | ND | ND | Hard brittle solid, excellent. |
| 15 | 43 | 6.5 | 10.9 | 93.8 | Clear soft solid, satisfactory. |
| 16 | 46 | 6.8 | 10.3 | 96.7 | Do. |
| 17 | 31 | 6.26 | 10.2 | 89.8 | Do. |
| 18 | 40 | 6.73 | 10.4 | 94.7 | Do. |
| 19 | 31 | 6.1 | ND | ND | Do. |
| 20 | 40 | 6.8 | 10.4 | 95.2 | Soft lumpy powder, excellent. |
| 21 | 31 | 6.73 | 10.3 | 94.8 | Yellow white fine powder, excellent. |
| 22 | 35 | 6.36 | 10.5 | 92.2 | Soft lumpy powder, satisfactory. |
| 23 | 52 | 6.68 | 10.2 | 95.8 | Clear jelly-like solid, excellent. |
| 24 | 32 | 6.96 | 10.6 | 95.6 | Do. |
| 25 | 65 | 6.71 | 10.5 | 94.5 | Clear solid, excellent. |
| 26 | 67 | 6.84 | 10.4 | 96.7 | Do. |
| 27 | 64 | 6.92 | 10.5 | 96.2 | Do. |
| 28 | 67 | 6.99 | 10.2 | 100 | Do. |
| 29 | 65 | 6.84 | 10.4 | 95.0 | Do. |
| 30 | 65 | 6.83 | 10.5 | 96.5 | Turbid solids to powders, satisfactory. |
| 31 | 57 | 6.86 | 10.7 | 93.3 | Do. |
| 32 | 59 | 6.84 | 10.6 | 98.4 | Do. |
| 33 | ND | ND | ND | ND | Polymer insoluble in acetone, insoluble in H₂O, satisfactory. |
| 34 | ND | ND | ND | ND | Polymer insoluble in acetone, insoluble in H₂O, fair. |
| 35 | ND | ND | ND | ND | Do. |
| 36 | ND | ND | ND | ND | No polymer could be precipitated, unsatisfactory. |
| 37 | ND | ND | ND | ND | Do. |
| 38 | ND | ND | ND | ND | Insoluble polymer in all solvents, satisfactory. |
| 39 | ND | ND | ND | ND | Do. |
| 40 | ND | ND | ND | ND | Do. |
| 41 | ND | ND | ND | ND | Do. |
| 42 | ND | ND | ND | ND | Polymer soluble in H₂O, insoluble in acetone, unsatisfactory. |
| 43 | ND | ND | ND | ND | Soluble in acetone and H₂O, unsatisfactory. |
| 44 | 93 | 6.7 | 10.5 | 94.8 | |
| 45 | 88 | 6.99 | 10.2 | 100 | |
| 46 | 60 | ND | ND | ND | Opaque solid, excellent. |
| 47 | 60 | ND | ND | ND | Do. |
| 48 | 68 | ND | ND | ND | Do. |
| 49 | 77 | ND | ND | ND | Do. |
| 50 | 41 | ND | ND | ND | Do. |
| 51 | 35 | ND | ND | ND | Do. |
| 52 | 76 | ND | ND | ND | Do. |
| 53 | 76 | ND | ND | ND | Do. |
| 54 | 56 | ND | ND | ND | Do. |
| 55 | 77 | ND | ND | ND | Do. |

*ND=not determined.

TABLE IV.—COPOLYMERS OF TRIALLYLAMINE

Abbreviations: MDAA=methyldiallylamine; TAMACl=triallylmethylammonium chloride; DAA=diallylamine; AA=allylamine.

| Ex. No. | Mls. of 75% w./v. TAA·HCl added | Solvent added | Comer Type | Conc., percent w./v. | Mls added | Mole ratio, TAA: comer | pH | Temp., °C. | Dose, mega-rads | Yield, percent | Type of polymer-isation | Equilib-rium capacity | Comment |
|---|---|---|---|---|---|---|---|---|---|---|---|---|---|
| 56 | 1.5 | | MDAAHCl | 71 | 10 | 0.1 | 5.2 | 20 | 12 | 93 | Solution | 8.15 | |
| 57 | 1.5 | Dioxan [2] | MDAAHCl | 71 | 10 | 0.1 | 5.2 | 20 | 12 | 92 | Precipitation | 8.53 | |
| 58 | 5.5 | | MDAAHCl | 71 | 4.5 | 1 | 5.2 | 20 | 12 | 80 | Solution | 7.39 | |
| 59 | 5.5 | Dioxan [2] | MDAAHCl | 71 | 4.5 | 1 | 5.2 | 20 | 12 | 90 | Precipitation | 8.03 | |
| 60 | 10 | | DAAHCl | 100 | 5.8 | 1 | 5.2 | 20 | 10 | 84 | Solution | 8.28 | |
| 61 | 10 | Dioxan [2] | DAAHCl | 100 | 5.8 | 1 | 5.2 | 20 | 10 | 86 | Precipitation | 8.32 | |
| 62 | 10 | | DAAHCl | 100 | 0.58 | 10 | 5.2 | 20 | 10 | 83 | Solution | 6.9 | [1] |
| 63 | 10 | Dioxan [2] | DAAHCl | 100 | 0.58 | 10 | 5.2 | 20 | 10 | 75 | Precipitation | 7.11 | |
| 64 | 10 | | AAHCl | 63 | 0.65 | 10 | 5.2 | 20 | 10 | 83.5 | Solution | 7.07 | |
| 65 | 10 | | TAMACl | 70 | 2 | 8 | 5.2 | 20 | 10 | 50 | do | 6.65 | |
| 73 | 10 | Acetone [2] | MDAAHCl | 71 | 0.38 | 20 | 5.2 | 20 | 10 | 85 | Precipitation | 7.0 | |
| 74 | 10 | do [2] | MDAAHCl | 71 | 0.22 | 30 | 5.2 | 20 | 10 | 86 | do | 7.1 | |
| 75 | 10 | do [2] | MDAAHCl | 71 | 1.03 | 15 | 5.2 | 20 | 10 | 89 | do | 7.4 | |

[1] Hard opaque granules, excellent ion exchange resins.
[2] 10 ml.

NOTE.—All of the copolymers 56 to 65 inclusive and 73 to 75 inclusive were heat stable when tested by the method of Example 79.

TABLE V.—DISPERSION POLYMERISATION OF TRIALLYLAMINE POLYMERISATION CONDITIONS

Abbreviations: EDB=ethylene dibromide; EDC=ethylene dichloride

| Example No. | Mls. of TAA·HCl 75% w./v. added | Suspension medium, mls. | Stabiliser G. | Stabiliser Type | Initiator Type | Initiator Amount g./ml. water | Temp., °C. | Time, hours |
|---|---|---|---|---|---|---|---|---|
| 66 | 20 | Xylene 148 plus EDB 33 | 2 | Ethyl cellulose | $(NH_4)_2S_2O_8$ | 3/10 | 80 | 4 |
| 67 | 30 | Xylene 148 plus EDB 33 | 2 | do | $(NH_4)_2S_2O_8$ | 5/20 | 83 | 6 |
| 68 | 20 | Benzene 179 plus EDC 36 | 2 | do | $(NH_4)_2S_2O_8$ | 2/20 | 80 | 4 |
| 69 | 20 | Xylene 179 plus EDC 36 | 2 | do | Gamma radiation | (1) | 20 | |
| 70 | 20 | Benzene 179 plus EDC 36 | 1 | do | do | (2) | 20 | |

[1] 11.1 megarads.
[2] 10 megarads.

TABLE VI.—DISPERSION POLYMERISATION OF TRIALLYLAMINE POLYMER PROPERTIES

| Example No. | Yield, percent | Elemental analysis C | H | N | O[1] | Cl | S | Ash | Equilib-rium capacity, meq./g. | Percent capacity of theoret-ical maximum | Comment |
|---|---|---|---|---|---|---|---|---|---|---|---|
| 66 | 53 | 69.51 | 9.98 | 8.92 | 7.44 | 2.2 | 1.96 | [2]ND | 5.9 | 92 | Prior art, BP 939,518. |
| 67 | 56 | 66.3 | 9.59 | 8.53 | 7.72 | 2.2 | 1.46 | 2.64 | 5.56 | 91.3 | Do. |
| 68 | 53 | 66.7 | 9.81 | 8.92 | 7.10 | 2.2 | 1.06 | 2.61 | 5.6 | 87 | Prior art. |
| 69 | 82 | 73.9 | 10.2 | 9.52 | 2.98 | <0.3 | | 0.12 | 6.7 | 99 | Example according to this invention. |
| 70 | 89 | 75.5 | 10.7 | 10.2 | 2.6 | <0.3 | | 0.16 | 6.96 | 96 | Do. |

[1] Gross oxygen, includes oxygen attributable to water.
[2] ND=not determined.

Example 76

A stainless steel reaction vessel of 220 litre capacity provided with a lid, stirrer, inlets and outlets for gas and liquid, a jacket for cooling and an annular jacketed tube reaching from the bottom to the center of the vessel was charged with 42 litres of a 75% w/v solution of triallylamine hydrochloride in water and 168 litres of acetone. The pH of the mixture was adjusted to 5.2. The vessel and stirred contents were purged with nitrogen and a nitrogen pressure of 2 lb./sq.in. was applied at the stirrer gland to avoid ingress of oxygen. A 5,000 curie source of Cobalt 60 measuring 6 inches × 2 inches was placed in the annular tube at the center of the vessel and the contents irradiated for 132 hours at room temperature. The Cobalt 60 source was then removed and the contents of tee vessel, an opaque slurry with the appearance and consistency of cream cheese, was removed and washed with water until free of acetone, with 2N HCl until free of detectable amine, with 0.5 N NaOH until free of detectable chloride ion, and finally with water until the effluent was neutral to phenolphthalein. The polymer so obtained was in the form of substantially spherical particles of diameter between 1 and 3 microns and had a capacity as an ion exchange resin of 7.1 meq./g. of resin. The yield of monomer was 89%.

Example 77

Example 76 was repeated but the reaction charge of that example was replaced by 80 litres of a 71% w/v solution of methyldiallylamine hydrochloride in water, 30 litres of a 75% w/v solution of triallylamine hydrochloride in water and 100 litres of acetone. The copolymer so obtained was in the form of substantially spherical particles of diameter between 3 and 6 microns and had a capacity as an ion exchange resin of 6.9 meq./g. of resin. The yield was 88%.

Example 78

This comparative example demonstrates that in a composite absorbent polymer of the prior art are less effective than out polymers when used as ion exchange media. Composite absorbents based on cross-linked poly(vinyl alcohol) was prepared as described in example 1 of Australian Pat. application 30165/67 except that the amine resin "Deacidite G" (Registered Trade Mark) of that example was replaced on an equivalent capacity basis by a. a prior art resin prepared by ball-milling the resin prepared in out prior art example 67 to a fineness such that it passed a 300 mesh BSS sieve b. a triallylamine resin according to our invention prepared according to our example 76

The effective salt uptake of the composite adsorbent containing these resins (a) or (b) was determined by the method described in example 1 of Australian Pat. application 30165/67 at a pH of 5.4.

The following results were obtained

| Composite adsorbent containing— | Effective capacity of composite resin (meq./ml.) |
|---|---|
| Prior art resin of Example 67 | 0.09 |
| Triallylamine resin of Example 76 | 0.19 |

Example 79

This example demonstrates the method of determining the heat stability of polymers and copolymers according to our invention. A sample of the product obtained in example 3 was dried, 6 mg. of the dried sample was formed into a disc with 0.2 g. dry K Br and its infrared absorption spectrum was determined. 8 mg. of the dried sample was placed in an aluminum dish and heated at the rate of 64° C./minute in a differential scanning calorimeter Perkin Elmer DSC1 over the range of temperature 20° to 380° C. The heated sample was then removed from the instrument and its infrared spectrum determined as above. No substantial change in the spectrum from that of the unheated sample at the peaks 910 cm.[11] and 980 cm.[11] was observed. The procedure was repeated for the products of examples 56 and 74 and again no substantial change in the infrared spectrum at the peaks 910 cm.[11] and 980 cm.[11] was observed in either case.

We claim:

1. A solid polymer comprising between 3 and 100 mole percent of triallylamine and a balance of at least one allylamine comer selected from the group consisting of the compounds of the formulae

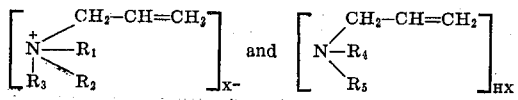

wherein $R_1$, $R_2$, $R_3$, $R_4$ and $R_5$ each separately may be hydrogen, allyl, alkyl or aryl and at least one of $R_4$ and $R_5$ is hydrogen or alkyl and X is a monovalent anion of a strong acid or the monovalent equivalent of a multivalent anion and wherein the polymer has a total content of chlorine, sulphur and oxygen other than oxygen bound in water of less than 0.5% by weight and a high degree of stability characterized in that on heating from 20° to 380° C. at the rate of 64° C./minute the infrared absorption spectrum at the peaks 910 cm.[11] and 980 cm.[11] remains substantially unchanged and characterized further in that its titration (pH) curve on neutralization with a strong acid exhibits a pH plateau between two points embracing at least 70 mole percent of the polymer such that the pH change over said plateau is less than 1 unit, said polymer having been prepared by exposing said allylic monomer or monomers to a total dose of from 3 to 20 megarads of high energy radiation at a temperature between −80° C. and +120° C.

2. A solid polymer comprising between 3 and 100 mole percent of triallylamine and a balance of at least one allylamine comer selected from the group consisting of the compounds of the formulae

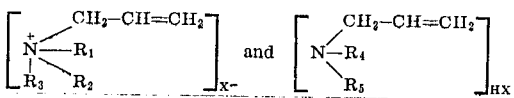

wherein $R_1$, $R_2$, $R_3$, $R_4$ and $R_5$ each separately may be hydrogen, allyl, alkyl or aryl and at least one of $R_4$ and $R_5$ is hydrogen or alkyl and X is a monovalent anion of a strong acid or the monovalent equivalent of a multivalent anion and wherein the polymer has a total content of chlorine, sulphur and oxygen other than oxygen bound in water of less than 0.5% by weight and a high degree of stability characterized firstly in that on heating from 20° to 380° C. at the rate of 64° C./minute the infrared absorption spectrum at the peaks 910 cm.[11] and 980 cm.[11] remains substantially unchanged, secondly in that its titration (pH) curve on neutralization with a strong acid exhibits a pH plateau between two points embracing at least 70 mole percent of the polymer such that the pH change over said plateau is less than 1 unit, and characterized thirdly in that in respect of the anion of a strong acid it has an equilibrium capacity of between 6.5 and 8.6 meg./g. of dry polymer, and polymer having been prepared by exposing said allylic monomer or monomers to a total dose of from 5 to 15 megarads of high energy radiation at a temperature between 10° and 40° C.

3. A substantially pure solid polymer of triallylamine having a free amine base content expressed as percent elemental nitrogen determined by elemental analysis between 10 and 10.9% by weight, a total content of chlorine, sulphur and oxygen other than oxygen bound in water of less than 0.5% by weight, a water regain value between 0.1 and 1.3 gram per gram of polymer and a high degree of thermal stability characterized in that, on heating from 20° to 380° C. at the rate of 64° C./minute, the infrared absorption spectrum at the peaks 910 cm.[11] and 980 cm.[11] remains substantially unchanged and characterized further in that its titration (pH) curve on neutralization with a strong acid exhibits a pH plateau between two points embracing at least 70 mole percent of the polymer such that the pH change over said plateau is less than 1 unit, said polymer having been prepared by exposing said triallylamine to a total dose of from 3 to 20 megarads of high energy radiation at a temperature between −80° and +120° C.

4. A substantially pure solid copolymer consisting of between 10 and 95 mole percent of triallylamine and a balance of at least one allylamine comer selected from the group consisting of the compounds of the formulae

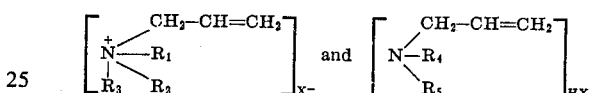

wherein $R_1$, $R_2$, $R_3$, $R_4$ and $R_5$ each separately may be hydrogen, allyl, alkyl or aryl and at least one of $R_4$ and $R_5$ is hydrogen or alkyl and X is a monovalent anion of a strong acid or the monovalent equivalent of a multivalent anion and wherein the copolymer has a total content of chlorine, sulphur and oxygen other than oxygen bound in water of less than 0.5% by weight and a high degree of stability characterized in that on heating from 20° to 380° C. at the rate of 64° C./minute, the infrared absorption spectrum at the peaks 910 cm.[11] and 980 cm.[11] remains substantially unchanged and characterized further in that its titration (pH) curve on neutralization with a strong acid exhibits a pH plateau between two points embracing at least 70 mole percent of the polymer such that the pH change over said plateau is less than one unit, said polymer having been prepared by exposing said allylic monomers to a total dose of from 3 to 20 megarads of high energy radiation at a temperature between −80° and +120° C.

5. A substantially pure solid copolymer consisting of from 85 to 97 mole percent of triallylamine (salt) mer units and a balance of a diallyl comer of the formula $RN(CH_2-CH=CH_2)_2$ or a salt thereof with an acid HX where R is hydrogen or lower alkyl and X is a monovalent anion or the monovalent equivalent of a multivalent anion and wherein the copolymer has a total content of chlorine, sulphur and oxygen other than oxygen bound in water of less than 0.5% by weight and a high degree of stability characterized in that on heating from 20° to 380° C. at the rate of 64° C. per minute the infrared absorption spectrum at the peaks 910 cm.[11] and 980 cm.[11] remains substantially uncharged and characterized further in that its titration (pH) curve on neutralization with a strong acid exhibits a pH plateau between two points embracing at least 70 mole percent of the polymer such that the pH change over said plateau is less than 1 unit, said polymer having been prepared by exposing said allylic monomers to a total dose of from 3 to 20 megarads of high energy radiation at a temperature between −80° and +120° C.

6. A substantially pure solid copolymer consisting of from 3 to 15 mole percent of triallylamine (salt) mer units and a balance of a diallyl comer unit which is a diallylamine of the formula $RN(CH_2-CH CH_2)_2$ or a salt thereof with an acid HX where R is hydrogen or lower alkyl and X is a monovalent anion or the monovalent equivalent of a multivalent anion and wherein the copolymer has a total content of chlorine, sulfur and oxygen other than oxygen bound in water of less than 0.5% by weight and a high degree of stability characterized in that on heating from 20° to 380° C. at the rate of 64° C. per minute the infrared absorption spectrum at the peaks 910 cm.[11] and 980 cm.[11] remains substantially unchanged, and characterized further in that its titration (pH) curve on neutralization with a strong acid exhibits a pH plateau between two points embracing at least 70 mole percent of the polymer such that the pH change over said plateau is less than 1 unit, said polymer having been prepared by exposing said allylic monomers to a total dose of from 3 to 20 megarads of high energy radiation at a temperature between −80° and +120° C.

7. A polymer according to claim 5 wherein the comer is of formula $RN(CH_2-CH=CH_2)_2$ or a salt thereof and R is methyl.

8. A polymer according to claim 6 wherein the comer is of the formula $RN(CH_2-CH=CH_2)_2$ or a salt thereof and R is methyl.

9. A process of manufacturing a substantially pure polymer consisting of from 3 to 100 mole percent of triallylamine and a balance of at least one other allylamine derivative selected from the group consisting of

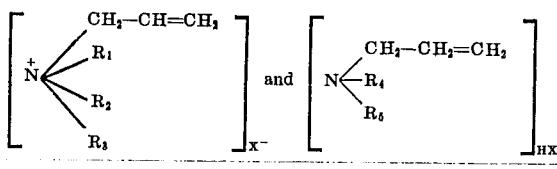

wherein $R_1$, $R_2$, $R_3$, $R_4$ and $R_5$ each separately may be hydrogen, allyl, alkyl or aryl and at least one of $R_4$ and $R_5$ is hydrogen or alkyl and X is a monovalent anion of a strong acid or the monovalent equivalent of a multivalent anion which process comprises exposing said allylic monomer or monomers to a total dose of from 3 to 20 megarads of high energy radiation between −80° and +120° C. and isolating the polymer salt so formed.

10. A process according to claim 9 wherein the temperature is between 10° and 40° C.

11. A homopolymerization process according to claim 9 wherein the monomer is a triallylamine salt and the resulting polymer is substantially pure poly(triallylamine).

12. A copolymerization process according to claim 9 wherein the comers are triallylamine (salt) and a diallylamine of the formula $RN(CH_2-CH=CH_2)_2$ or a salt thereof with an acid HX wherein R is alkyl arid X is a monovalent anion of a strong acid or the monovalent equivalent of a multivalent anion.

13. A process according to claim 9 wherein the polymer is precipitated in the form of quasispherical particles having a mean diameter from 0.5 to 10 microns which process comprises polymerizing the monomer under irradiation in a binary liquid mixture consisting of a solvent for the monomer salt and the polymer salt and a nonsolvent for the polymer salt.

14. A process according to claim 9 wherein the polymer is precipitated in the form of quasispherical particles having a mean diameter from 0.5 to 10 microns which process comprises polymerizing the monomer under irradiation in a binary liquid mixture consisting of water and acetone.

15. A process according to claim 9 wherein the total dose of irradiation delivered to the polymerization mixture is from 5 megarad to 15 megarad.

* * * * *